United States Patent [19]

Brown

[11] Patent Number: 5,639,971
[45] Date of Patent: Jun. 17, 1997

[54] METHOD AND APPARATUS FOR DETECTING A SIGNAL

[75] Inventor: Alvin E. Brown, Santa Cruz, Calif.

[73] Assignee: Dieterich Technology Holding Corp., Boulder, Colo.

[21] Appl. No.: 720,863

[22] Filed: Oct. 4, 1996

[51] Int. Cl.[6] .................................................. G02F 1/66
[52] U.S. Cl. ..................... 73/861.28; 73/861.27
[58] Field of Search ........................... 73/861.27, 861.28, 73/861.29, 861.31

[56] References Cited

U.S. PATENT DOCUMENTS

| | | | |
|---|---|---|---|
| 4,538,469 | 9/1985 | Lynnworth et al. | 73/861.27 |
| 4,542,656 | 9/1985 | Johnson | 73/861.28 |
| 4,583,410 | 4/1986 | O'Neil | 73/861.28 |
| 4,633,719 | 1/1987 | Vander Heyden | 73/861.28 |
| 4,708,022 | 11/1987 | Johnson | 73/861.28 |
| 4,922,750 | 5/1990 | Magori | 73/861.29 X |
| 5,035,147 | 7/1991 | Woodward | 73/861.28 |

*Primary Examiner*—Elizabeth L. Dougherty
*Attorney, Agent, or Firm*—Richard W. Hanes

[57] ABSTRACT

A method of detecting a signal (50) in an ultrasonic flow meter sets a first threshold (52) and a second threshold (54) at a predetermined level above the first threshold (52). An ultrasonic signal (50) having a plurality of cycles is then received. Next it is determined when the ultrasonic signal (50) exceeds the first threshold (52). This time is marked a first threshold time. Then it is determined when the ultrasonic signal exceeds the second threshold (54). This time is marked a second threshold time. A time difference between the first threshold time and the second threshold time (56) is determined. When the time difference (56) exceeds a delta time, increasing the first threshold (52) a delta level.

20 Claims, 7 Drawing Sheets

5,639,971

METHOD AND APPARATUS FOR DETECTING A SIGNAL

FIELD OF THE INVENTION

The present invention relates generally to the field of ultrasonic flow meters and more particularly to a method and apparatus for detecting a signal.

BACKGROUND OF THE INVENTION

Ultrasonic flow meters have many advantages over other methods of determining flow rates. Ultrasonic flow meters can continuously measure the flow rate, while other methods generally measure average flow rates. In addition, ultrasonic flow meters are obstructionless and work with non-conductive fluids.

Ultrasonic flow meters have a pair of transducers that are placed on either side of the flow path of a fluid flowing through a pipe. The transducers are pointed at each other and placed on either side of the flow path of a fluid flowing through a pipe. The line between the transducers has a component in the direction of the fluid flow. The principle used to detect flow rates is that the transit time of an ultrasonic packet will increase in the upstream and decrease in the downstream path. The amount by which the transit time changes is directly proportional to the flow rate. Generally, the signal is detected by setting threshold and determining when the signal exceeds the threshold. Once the threshold is exceeded the signal is detected at the next positive going, zero threshold. Unfortunately, noise can cause the signal to exceed the threshold on a first cycle or after the first cycle. As a result the ultrasonic flow meter is detecting the received signal at different points along the signal. This result is inconsistent and erroneous transit time information. Automatic gain control circuits are used to overcome this problem. An automatic gain control circuit adjusts the overall signal so that it has a constant amplitude. However, the automatic gain control circuit only adjusts the overall signal level and noise can still cause the signal to cross the first threshold level at different points along the signal.

Thus there exists a need for a method an apparatus that can detect the signal at the same point along the signal consistently.

SUMMARY OF THE INVENTION

A method of detecting a signal in an ultrasonic flow meter that overcomes these and other problems sets a first threshold and a second threshold at a predetermined level above the first threshold. An ultrasonic signal having a plurality of cycles is then received. Next it is determined when the ultrasonic signal exceeds the first threshold. This time is marked a first threshold time. Then it is determined when the ultrasonic signal exceeds the second threshold. This time is marked a second threshold time. A time difference between the first threshold time and the second threshold time is determined. When the time difference exceeds a delta time, increasing the first threshold a delta level.

DETAILED DESCRIPTION OF THE DRAWINGS

Figure 1:
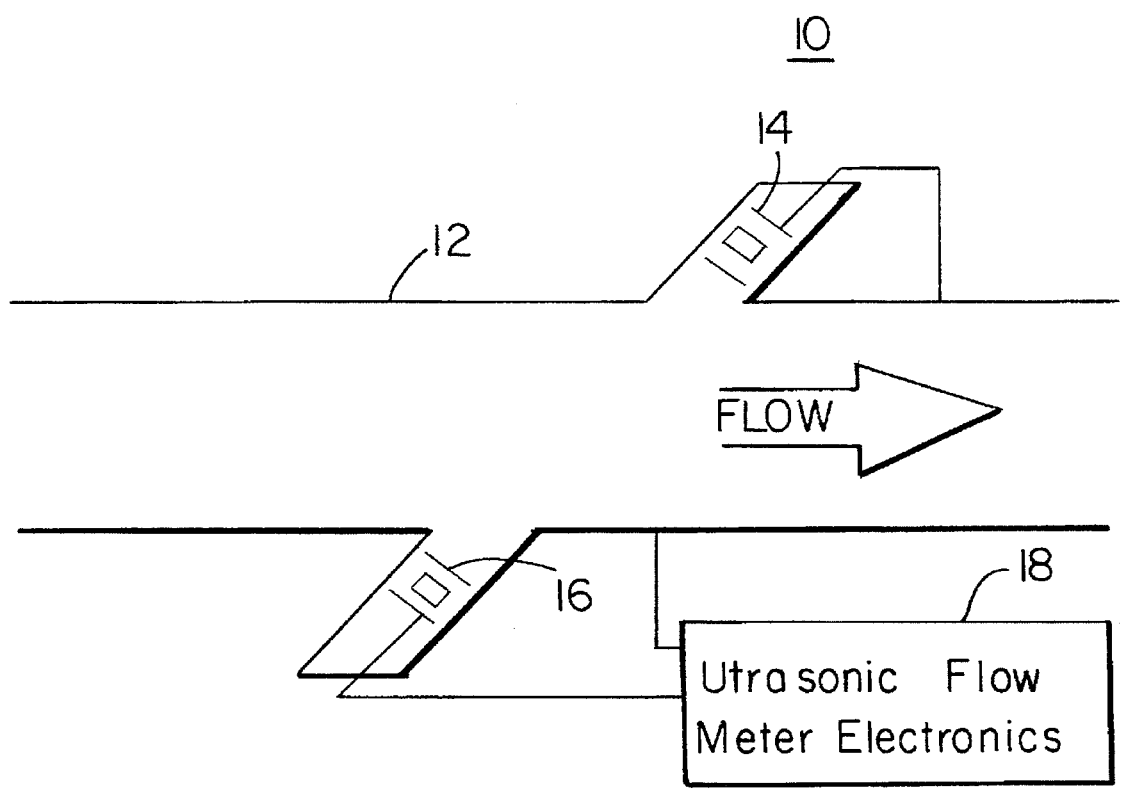
FIG. 1 is a schematic diagram of an ultrasonic flow meter attached to a conduit.

An ultrasonic flow meter 10 attached to a pipe 12 having a fluid flowing through it is shown in FIG. 1. The ultrasonic flow meter has a pair of transducers 14, 16. The pair of transducers 14, 16 are coupled to the ultrasonic flow meter electronics 18, that generates, detects and aligns an ultrasonic pulse.

Figure 2:
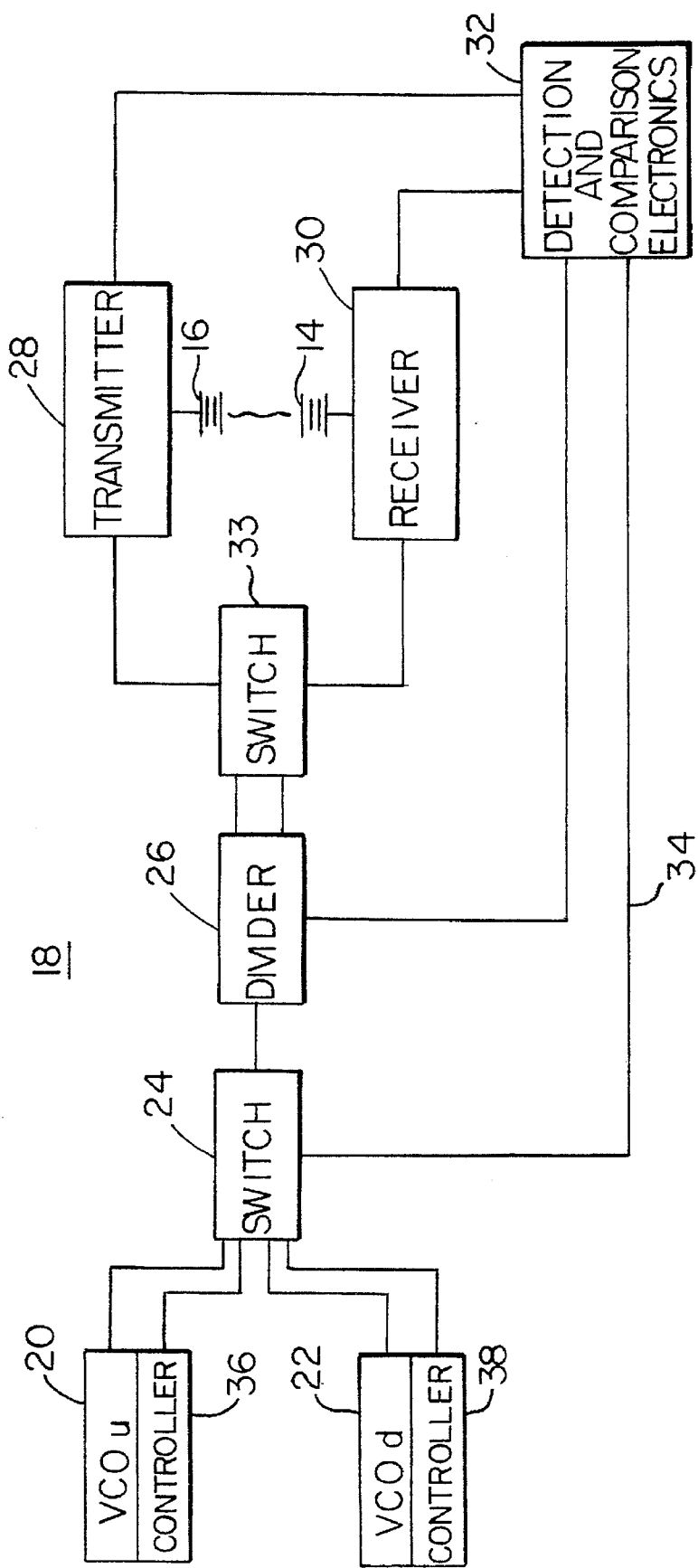
FIG. 2 is a block diagram of the ultrasonic flow meter.

FIG. 2 is a block diagram of the ultrasonic flow meter electronics 18 connected to the pair of transducers 14, 16. An upstream voltage controlled oscillator 20 and a downstream voltage controlled oscillator 22 are alternatively used to drive a transmit transducer 14, 16. The voltage controlled oscillators (oscillator signal, oscillator) 20, 22 are connected to a switch 24 that couples the oscillator signal to a divider 26. The divider 26 divides the oscillator signal down that is then coupled to a transmitter 28, a receiver (receiver electronics) 30 and a detection and comparison electronics 32 by a switch 33. The receiver 30 is coupled to a receive transducer 14, 16. The detection and comparison electronics 32 generates an early-late control signal 34 that is used to drive a controller 36, 38 that controls the voltage controlled oscillator 20, 22.

Figure 3:
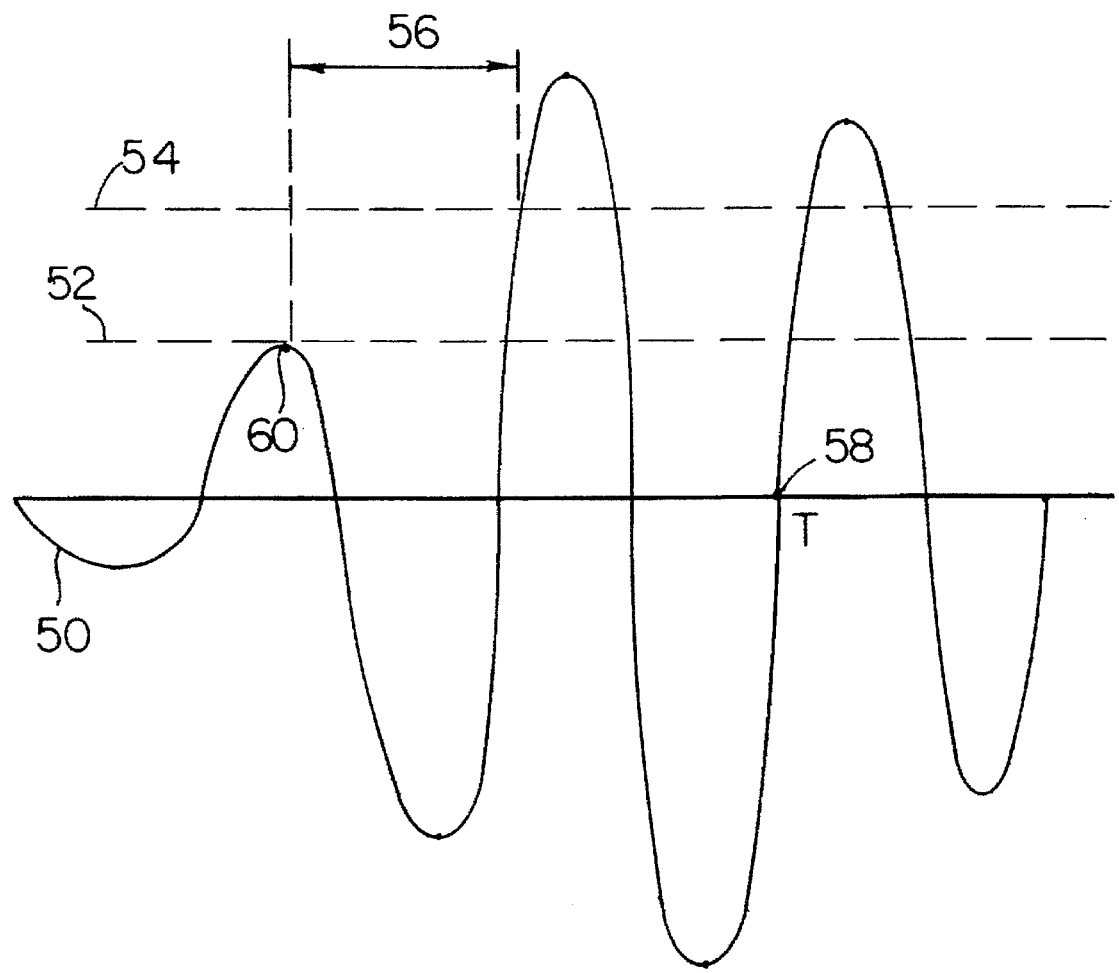
FIG. 3 is a signal diagram of a received signal.

FIG. 3 is a signal diagram of the received signal 50. The received signal 50 generally increases in amplitude for a couple of cycles and then decreases in amplitude for the last couple of cycles. The detection circuit first determines when the signal 50 crosses a first threshold (first level) 52. The detection circuit then determines when the signal crosses the second threshold (second level) 54. A time difference 56 between the crossing of the first threshold and the crossing of the second threshold is determined. When this time difference 56 is substantially less than one cycle (delta time), the detection circuit decreases the first threshold 52 by a delta level. The second threshold 54 is a fixed voltage (predetermined level, predetermined voltage) above the first threshold level 52. The period of the received signal 50 is known and is determined by the drive signal (transmit sequence) applied to the transmit transducer. In one embodiment, the drive signal has a period equal to the natural frequency of the transducer (i.e., 1.1 MHz). When the time difference 56 is greater than one half a period of the received signal 50 and less than one and one half periods, then the first threshold level 52 is increased. When the time period 56 is greater than one and one half the period of the received signal 50, it is assumed that noise has corrupted the detection process and the signal is not detected. When the time period 56 is less than one and one half the period, the signal is detected. The signal is detected at the next positive going, zero crossing 58 after the second threshold 54 is detected. In another embodiment the signal is detected at any subsequent zero crossing. This process insures that the signal 50 is always detected at the same point along the signal (i.e., at 2 ½ cycles from the start of the signal 50). Ideally, the first threshold will toggle between intersecting the first positive peak 60 and being just above the first positive peak 60. Thus the first threshold will alternately shift up and down the delta level.

Figure 4:
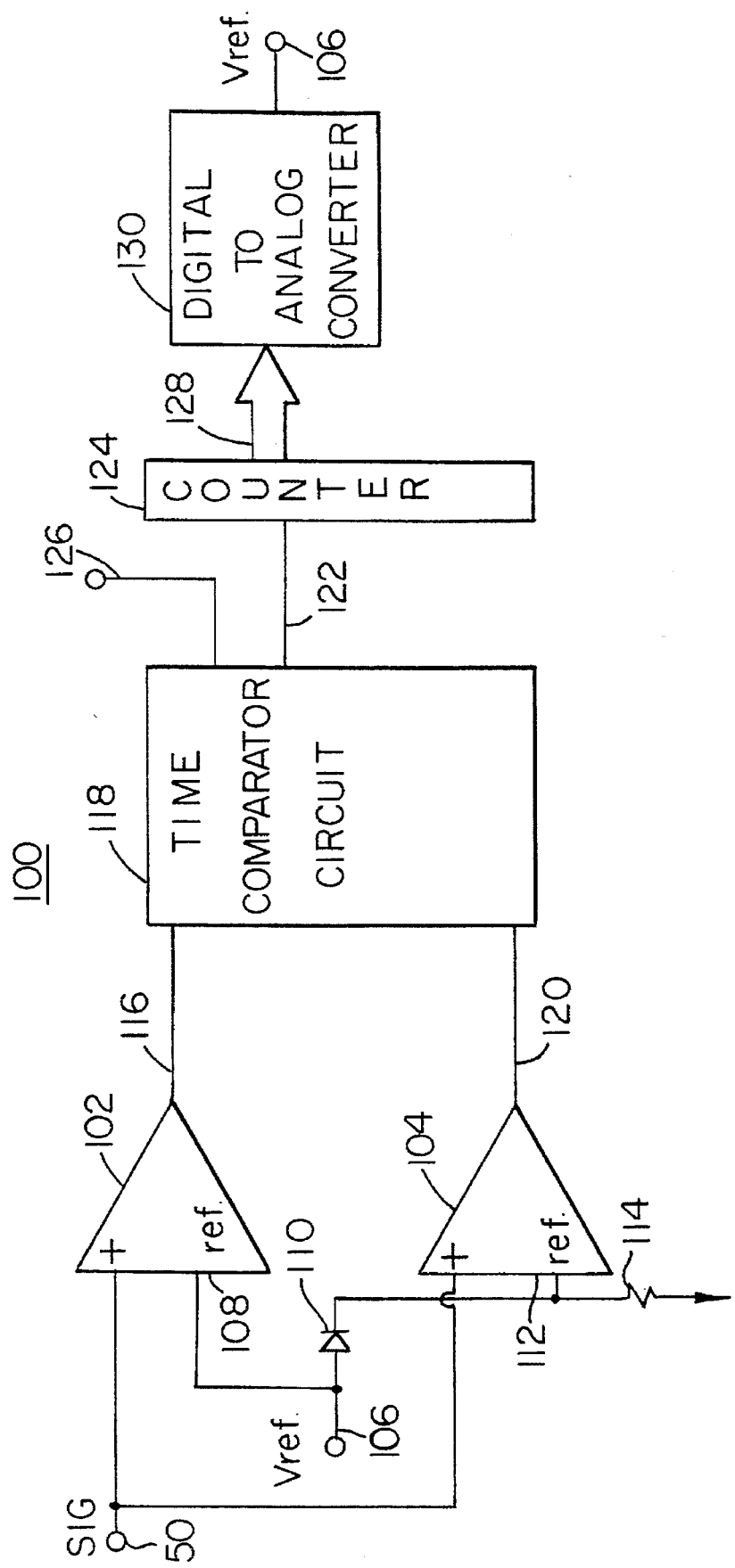
FIG. 4 is a block diagram of a detection circuit.

FIG. 4 is a block diagram of a detection circuit 100. The received signal 50 is applied to a pair of comparators 102, 104 that compare the signal against the first threshold 52 and the second threshold 54. A reference voltage 106 is applied to the reference input 108 of the comparator 102. The reference voltage 106 is equal to the second threshold 54. The reference voltage 106 is also applied across a diode 110 to a reference input 112 of the comparator (first threshold comparator) 104. The voltage at the reference input 112 is equal to the first threshold 52. A resistor 114 connects the reference input 112 to ground.

The output of comparator (second threshold comparator) 102 is a second threshold signal 116 that is coupled to the time comparator circuit 118. The output of comparator 104 is a first threshold signal 120 that is coupled to the time comparator circuit 118. The time comparator circuit 118 generates an up-down signal 122 that is used to drive a counter 124. The time comparator circuit 118 also generates a detection signal 126. The detection signal 126 is coupled to the comparison electronics 32 (see FIG. 2) to determine if the VCO's frequency needs to be increased or decreased. The output of the counter 124 is a count 128 that is coupled to a digital to analog converter 130. The digital to analog converter 130 converts the count 128 to a control voltage (reference voltage) 106. The reference voltage 106 includes and offset voltage and controls the threshold levels. In one embodiment the counter 124 includes decoding circuitry that prevents the counter from counting below zero. This insures that the first threshold level 52 does not suddenly jump to the high end of its range from the low end its range.

Figure 5:
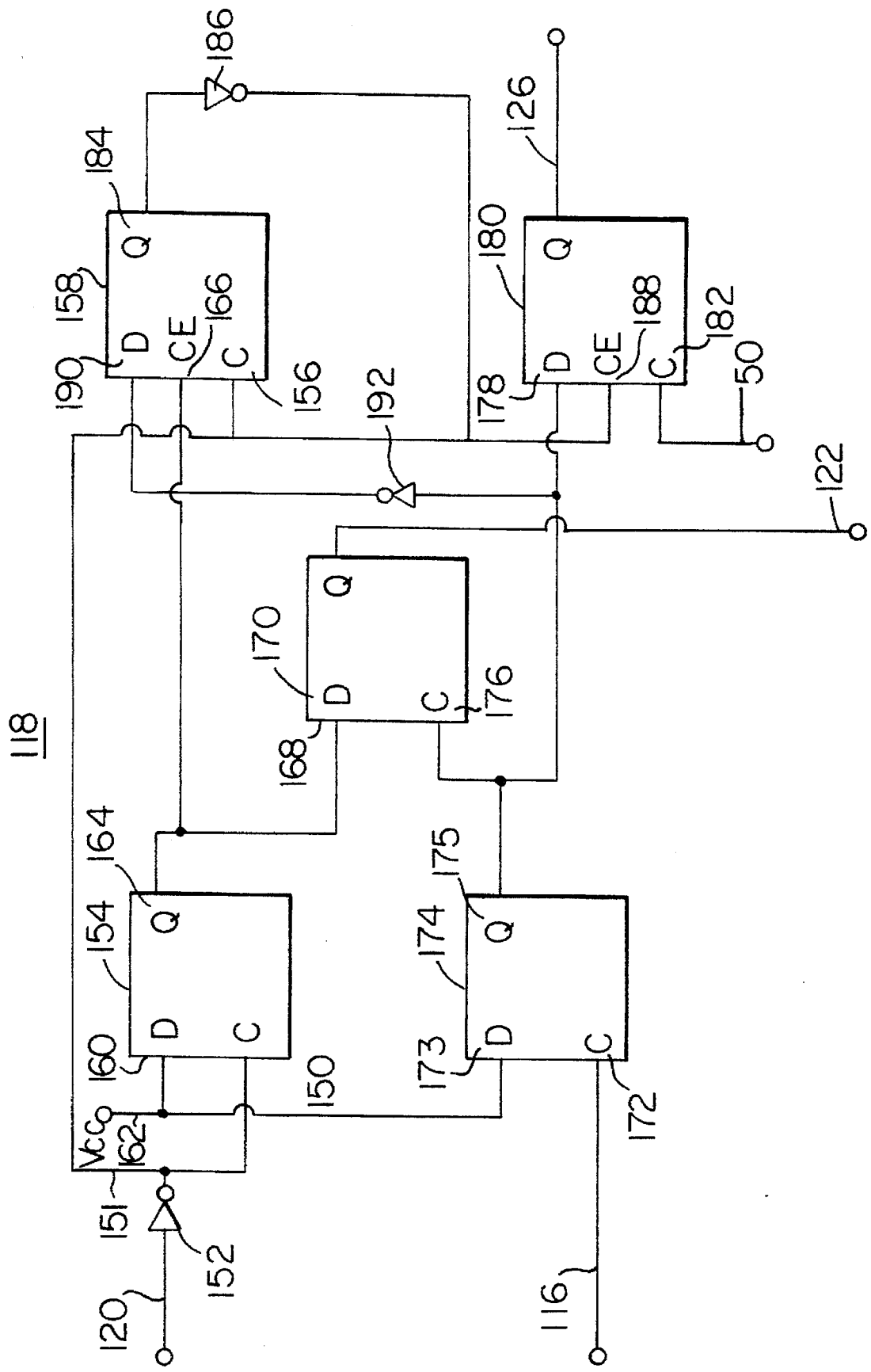
FIG. 5 is a block diagram of an embodiment of a time comparator circuit.

FIG. 5 is a block diagram of an embodiment of the time comparison circuit 118. The first threshold signal 120 is applied to an inverter 152 to form an inverted first threshold signal 151 and then to a clock input 150 of a D flip flop 154. The inverted first threshold signal 151 is also coupled to a clock input 156 of a D flip flop 158. A D-input 160 is connect to a supply voltage 162. A Q-output 164 of the flip flop 154 is coupled to an enable input 166 of the flip flop 158 and to a D-input 168 of a D flip flop 170. The second threshold signal 116 is coupled to a clock input 172 of a D flip flop 174. A D-input 173 of the flip flop 174 is tied to the supply voltage 162. A Q-output 175 of the flip flop 174 is coupled to a clock input 176 of a flip flop 170 and to a D-input 178 if a D flip flop 180. A Q-output of the flip flop 170 is the up-down signal 122. A clock input 182 is coupled to a buffered version of the received signal 50. A Q-output 184 of the flip flop 158 is coupled to an inverter and then to an enable input 188 of the flip flop 180. A Q-output of the flip flop 180 is the detection signal 126. A D-input 190 of the flip flop 158 is coupled to an inverter 192 that is coupled to the Q-output 175 of the flip flop 174.

Figure 6A:
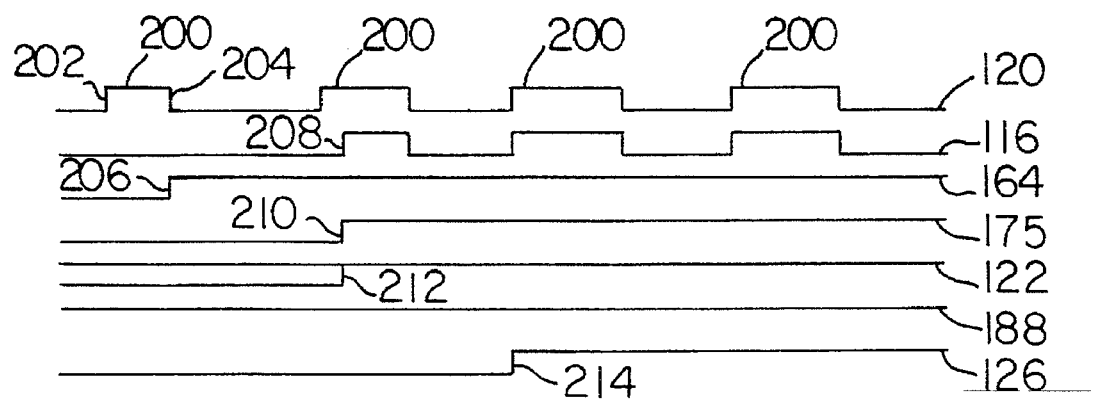
FIGS. 6a–c are signal diagrams of the signals used in the time comparator circuit of FIG. 5.

The operation of the time comparator circuit 118 will be explained with reference to the signal diagrams of FIGS. 6a–c. FIG. 6a shows the signals that occur when the first threshold 52 is increased. The first threshold signal 120 is shown as a square wave of with an increasing positive portion 200. The first threshold signal 120 is positive when the received signal 50 is above the first threshold 52. A first positive going edge (first positive edge, first edge) 202 is inverted by inverter 152 (see FIG. 5) and clocks the flip flop 154 on a trailing edge 204. This results in the Q-output 164 going high 206. The second threshold signal (second signal) 116 has a first positive going edge (first rising edge) 208 that clocks the flip flop 174 causing the Q-output 175 to go high 210. The flip flop 170 is then clocked by the Q-output going high 210, causing the Q output 122 to assume the input value 164 which is high. As a result the up-down signal 122 either goes high or remains high at point 212. The Q-output 175 also serves as the D-input 178 for the flip flop 180. The clock input 182 of the flip flop 180 is clocked by the received signal 50 and the Q-output (detection signal) 126 goes high (detection transition) 214 on the next positive going edge of the received signal after the D-input goes high 210 (i.e., the received signal trips the second threshold). The flip flops 154, 174, 158, 180 are cleared before the next ultrasonic signal is transmitted through the fluid.

Figure 6B:
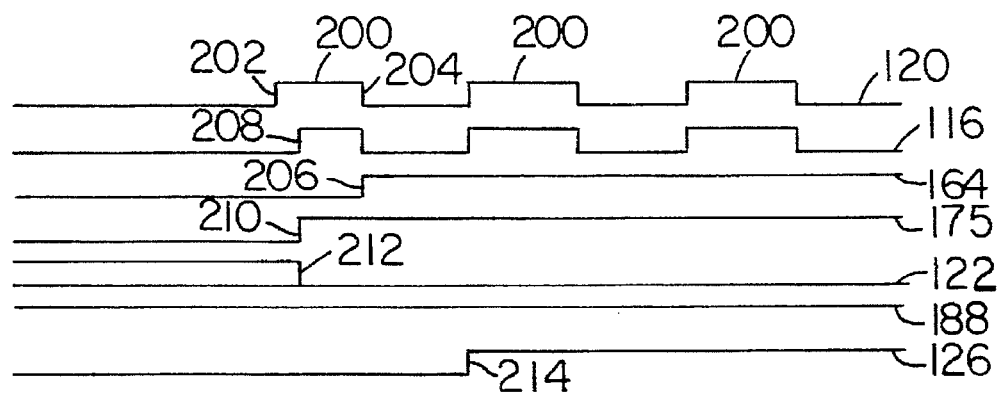

FIG. 6b shows the situation where the first threshold is decreased. In this case the Q-output 164 does not go high 206 before the clock 176 edge 210 of flip flop 170. As a result the Q-output 122 transitions low 212 or stays low.

Figure 6C:
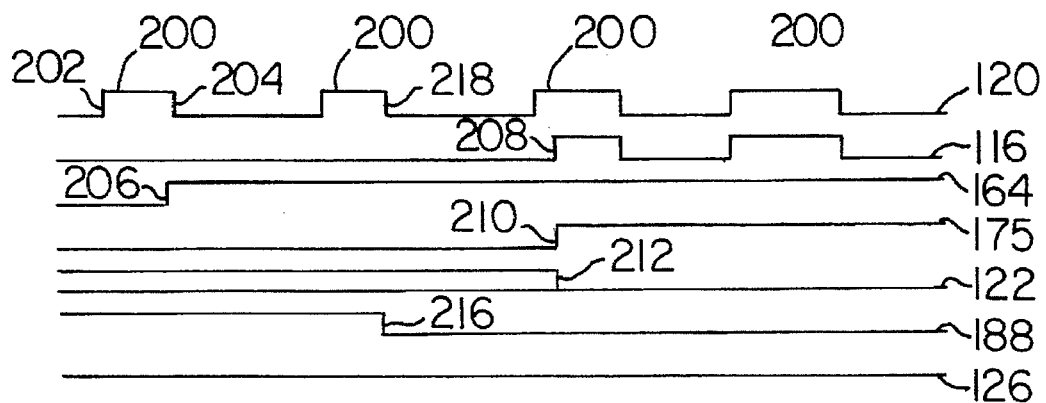

FIG. 6c shows the situation where the time difference is more than a reset time (control time). This occurs when the first threshold 52 trips on more than one cycle of the received signal 50 before the second threshold 54 trips. No signal is detected 214 in this situation. This is accomplished by having the enable input 188 go low 216 before a positive D-input 178 can be clocked by the received signal 182. The enable line 188 is normally high. This means the Q-output 184 is normally low. The D-input 190 goes low 210 when the Q-output 175 goes high 210. The flip flop 158 is clocked by the inverted first threshold signal 151. The flip flop 158 is not enabled until the Q-output 164 goes high 206. As a result the flip flop 158 is not enabled until the falling edge 204 of first threshold signal 120. The flip flop 158 is then clocked on a second falling edge 218 of the first threshold signal (first signal) 120. This clocks the inverse of signal 175 onto the Q-output 184, causing the Q-output to go high and the enable input 188 to go low 216. Disabling the flip flop 180 the next positive going, zero crossing after the second threshold 54 has been tripped 210.

Figure 7:
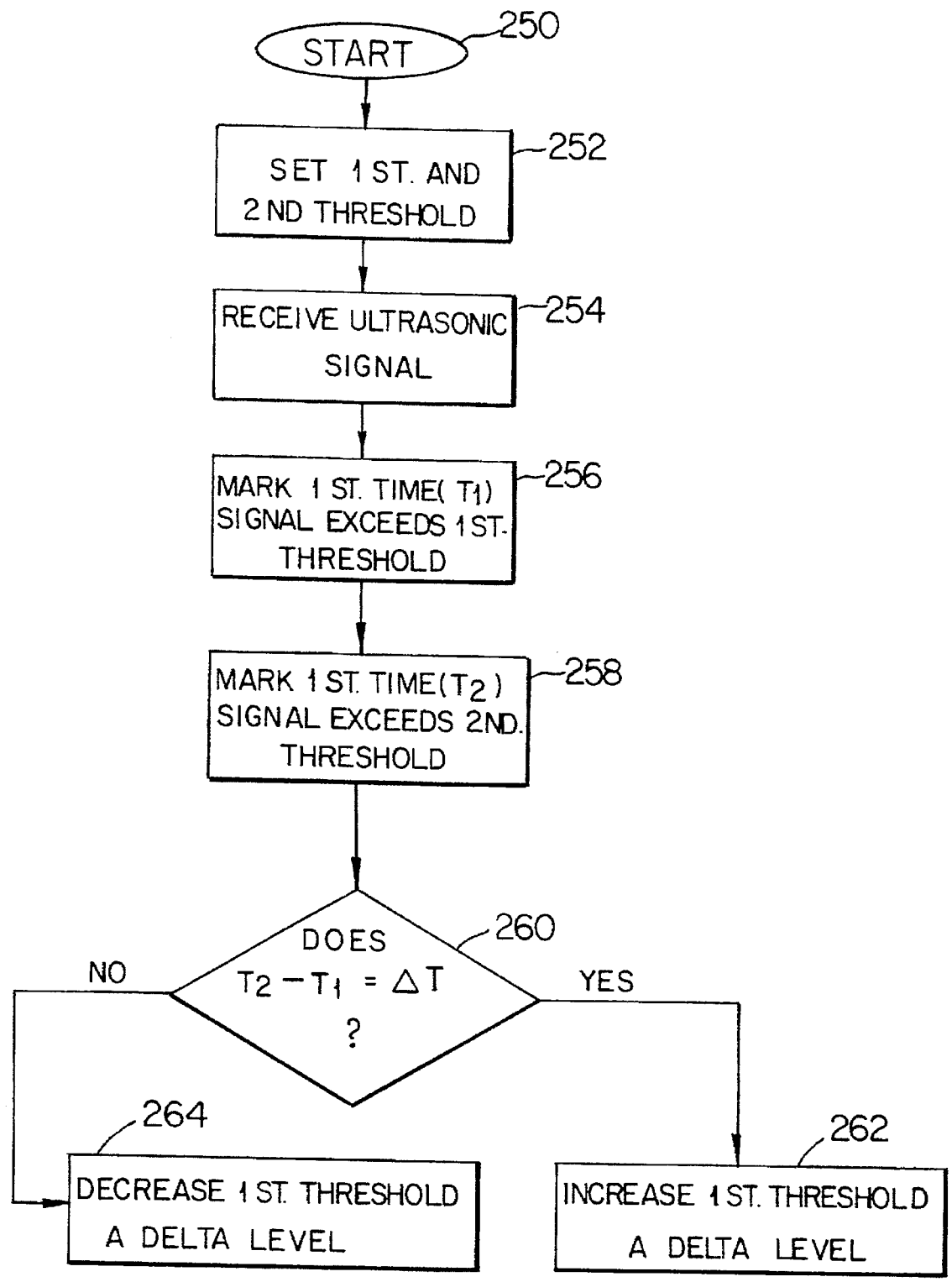
FIG. 7 is a flow chart of an embodiment of the steps used to detect an ultrasonic signal.

FIG. 7 is a flow chart of the process used to adjust the thresholds in the detection scheme. The process starts, step 250, by setting the first and the second threshold at step 252. The second threshold is set at a predetermined level above the first threshold. The ultrasonic signal having a plurality of cycles is received at step 254. The first time the signal exceeds the first threshold is marked as a first threshold time ($T_1$), at step 256. The first time the signal exceeds the second threshold is marked as a second threshold time ($T_2$), at step 258. At step 260, it is determined if the time difference between the first and second threshold time ($T_1$–$T_2$) is greater than a delta time. When the time difference is greater than a delta time, increasing the first threshold a delta level at step 262. When the time difference is not greater than the delta time, decreasing the first threshold level at step 264.

Thus there has been disclosed a method and apparatus for detecting a signal that detects the signal consistently at the same point along in the signal. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of detecting a signal in an ultrasonic flow meter, comprising:

(a) setting a first threshold;

(b) setting a second threshold at a predetermined level above the first threshold;

(c) receiving an ultrasonic signal having a plurality of cycles;

(d) determining when the ultrasonic signal exceeds the first threshold and marking this time a first threshold time;

(e) determining when the ultrasonic signal exceeds the second threshold and marking this time a second threshold time;

(f) when a time difference between the first threshold time and the second threshold time exceeds a delta time, increasing the first threshold a delta level.

2. The method of claim 1, further including the step of:

(g) returning to step (b).

3. The method of claim 1, further including the steps of:

(h) when the time difference does not exceed the delta time, decreasing the first threshold by the delta level;

(i) returning to step (b).

4. The method of claim 1, wherein step (e) further includes the steps of:

(e1) marking a subsequent, zero crossing as a detection point.

5. The method of claim 1, wherein step (e) further includes the step of:

(e1) when the ultrasonic signal exceeds the first threshold a second time before the second threshold time, determining if the second time occurs sooner than a control time before the second threshold time;

(e2) when the second time occurs sooner than the control time before the second threshold time, marking a next, positive going, zero crossing as a detection time.

6. The method of claim 5, further including the steps of:

(e3) when the second time occurs later than the control time before the second threshold time, clearing the first threshold time and the second threshold time;

(e4) returning to step (c).

7. An apparatus for detecting a signal in an ultrasonic flow meter, comprising:

a transmitter generating a transmit sequence;

a transmit transducer receiving the transmit sequence and transmitting an ultrasonic signal;

a receive transducer receiving the ultrasonic signal and forming a received signal;

a receiver having a first threshold comparator and a second threshold comparator, the first threshold comparator comparing the received signal to a first level to form a first threshold signal, the second threshold comparator comparing the received signal to a second level to form a second threshold signal;

a time comparator circuit comparing a first negative edge of the first threshold signal to a first rising edge of the second threshold signal to form a time difference and adjusting the first level based on the time difference.

8. The apparatus of claim 7, wherein the transmit sequence has a plurality of cycles.

9. The apparatus of claim 8, wherein the plurality of cycles have a period equal to a natural frequency of the transmit transducer.

10. The apparatus of claim 7, wherein the second level is a predetermined voltage higher than the first level.

11. The apparatus of claim 7, wherein the time comparator circuit generates a detection signal that has a detection transition when the received signal has a zero crossing a predetermined time after the first rising edge of the second threshold signal.

12. The apparatus of claim 7, wherein the time comparator circuit generates an up-down signal.

13. The apparatus of claim 12, further including:

a counter coupled to the up-down signal and forming a count; and a digital to analog converter receiving the count and forming the first level.

14. A method of detecting a signal in an ultrasonic flow meter, comprising:

(a) transmitting an ultrasonic signal;

(b) receiving the ultrasonic signal;

(c) comparing the ultrasonic signal to a first threshold to form a first signal;

(d) comparing the ultrasonic signal to a second threshold to form a second signal;

(e) determining a time difference between a first edge of the first signal and a first edge of the second signal; and (f) when the time difference is less than a delta time, decreasing a first threshold a delta level.

15. The method of claim 14, wherein step (c) further includes the step of:

(c1) setting the second threshold a predetermined level higher than the first threshold.

16. The method of claim 14, further including the step of:

(g) detecting the ultrasonic signal at a positive going, zero crossing after the first edge of the first signal has occurred and the first edge of the second signal has occurred.

17. The method of claim 14, further including the step of:

(g) when the time difference is greater than or equal to the delta time, increasing the first threshold the delta level.

18. The method of claim 14, further including the steps of:

(g) when the time difference is greater than or equal to a reset time, not detecting the received signal;

(h) returning to step (a).

19. The method of claim 14, further including the steps of:

(g) when the time difference is greater than or equal the delta time and less than a reset time, increasing the first threshold;

(h) when the time difference is greater than or equal the reset time, returning to step (a);

(i) detecting the ultrasonic signal at a zero crossing after the first edge of the first signal has occurred and the first edge of the second signal has occurred.

20. The method of claim 19, wherein step (f) further includes the step of:

(g1) increasing the second threshold.

* * * * *